July 21, 1931.  W. M. JENKINS  1,815,671
EQUIPMENT OF AIR BRAKES ON LOCOMOTIVES
Filed Oct. 14, 1929
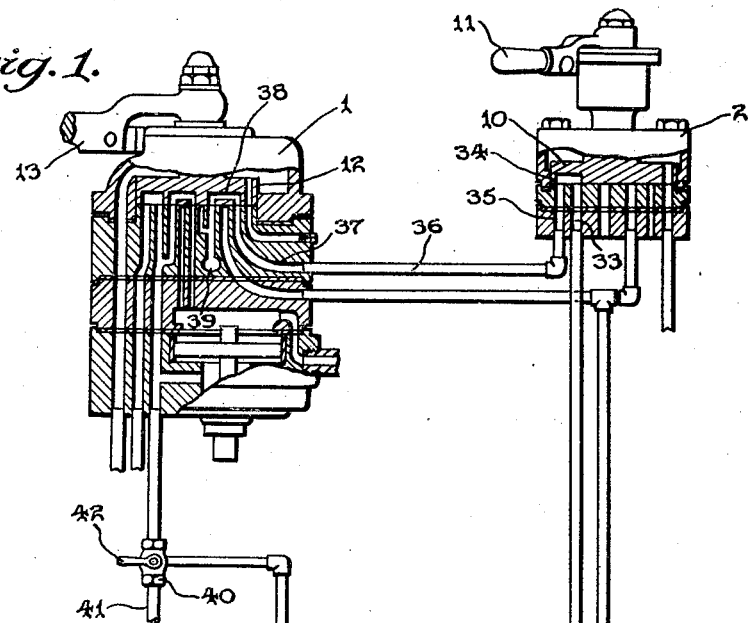
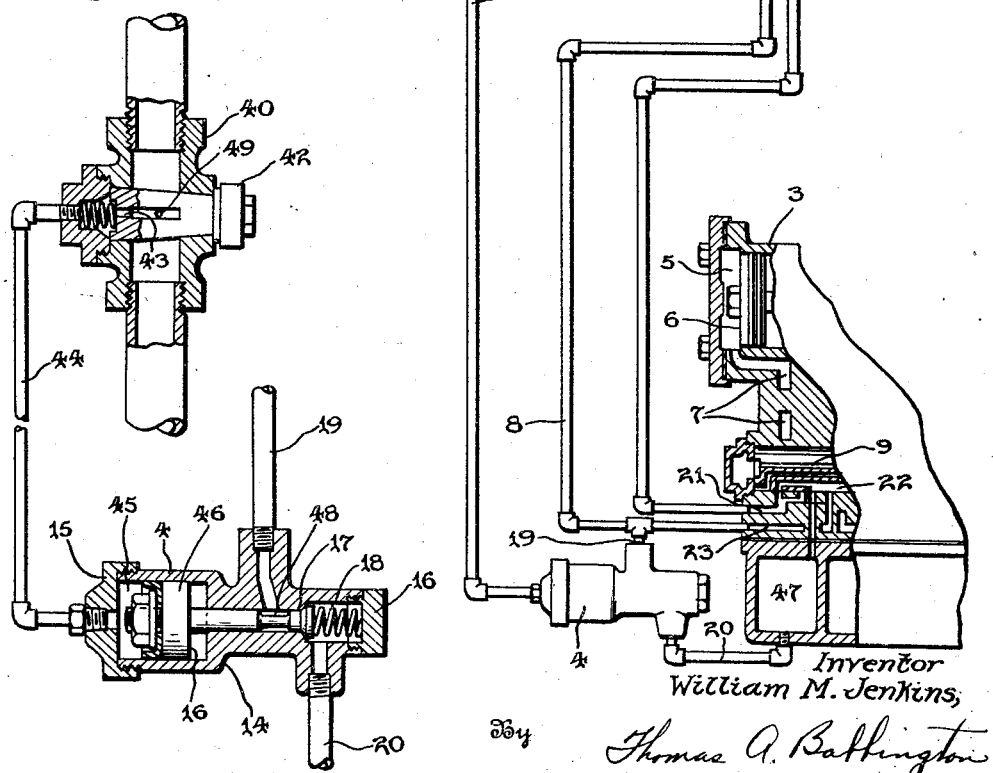
Inventor
William M. Jenkins,
By Thomas A. Battington
Attorney Patented July 21, 1931

1,815,671

UNITED STATES PATENT OFFICE

WILLIAM M. JENKINS, OF DALHART, TEXAS

EQUIPMENT OF AIR BRAKES ON LOCOMOTIVES

Application filed October 14, 1929. Serial No. 399,717.

This invention relates to improvements in air brakes, and particularly to improvements in the E. T. automatic brake equipment as employed on locomotives.

The usual E. T. brake equipment includes an automatic brake valve, an independent brake, and a distributing valve, the operation of the above brake valves controlling the locomotive brakes through a distributing valve release pipe and an application cylinder pipe which connects the automatic and the independent valves with the distributing valve.

In the running position of the valves, the application cylinder of the distributing valve is in communication with the atmosphere through the distributing valve release pipe and the parts in the independent and automatic brake valves.

It is well known to those skilled in the art that, under normal running conditions, the equalizing piston of the distribution valve has a tendency to creep or shift from the release position toward the service position, carrying with it the equalizing slide valve and the graduating slide valve, closing the passage between the application cylinder and application chamber and permitting air to leak through the equalizing slide valve and the graduating slide valve into the application cylinder. The resulting pressure built up in the application cylinder opens the application valve and allows air in the main reservoir to pass to the brake cylinder causing a partial application of the brakes. This application of the brakes causes the brake shoes to drag on the tires of the wheels, causing friction and heating and consequent expansion and loosening of the tires.

The primary object of the present invention is to provide means for establishing communication between the application cylinder and chamber and the atmosphere through the independent and automatic brake valves and thereby prevent the building up of pressure in the application cylinder, due to any leakage which may occur through the equalizing slide valve, or graduating slide valve, or both.

Other objects and advantages of the improved air brake attachment will be readily apparent by reference to the following description taken in connection with the accompanying drawings and it will be readily understood that various modifications in the specific structure shown may be made within the scope of the claims without departing from the spirit of the invention.

In the accompanying drawings, Fig. 1 is a diagrammatic view, partly in vertical elevation and partly in section of a portion of a locomotive air brake equipment with the attachment embodied therein, and Fig. 2 is an enlarged sectional view of the attachment.

The brake equipment comprises an automatic brake valve 1, an independent brake valve 2, a distributing valve 3, and the valve 4 of the attachment.

The distributing valve 3 is provided with the application cylinder 5, an application piston 6, a passage for establishing communication between the application cylinder 5 and the release pipe 8, and an equalizing valve 9, adapted to be operated by a piston (not shown).

The independent brake valve 2 comprises a casing containing a rotary valve 10 which is operated by a handle 11.

The automatic brake valve 1 comprises a casing containing a rotary valve 12 adapted to be operated by a handle 13.

The valve 4 and pipe connections 19 and 20 forming the subject matter of the present invention, comprises a casing 14 having the caps 15 and 16 threadedly secured in the opposite ends thereof and a piston 46 adapted to unseat the check valve 17 against the pressure of the coil spring 18 to establish communication between the pipes 19 and 20.

With the handles of the automatic and the independent brake valves in running position, and the equalizing slide valve 9 in release position, the application cylinder 5 of the distributing valve 3 is in communication with the atmosphere through the passages 7 and 21, cavity 22 in the equalizing slide valve 9, passage 23, the distributing valve release pipe 8, passage 33 in the independent brake valve 2, cavity 34 in the rotary valve 10, passage 35, pipe 36, passage 37 in the automatic brake valve 1, cavity 38 in the rotary valve 12, and the atmospheric exhaust port 39.

In double heading, the automatic and independent valves are left in running position on the second or non-operating engine, and the double heading cock under the automatic brake valve 1 must be closed to cut off communication from the brake pipe 40 to the automatic brake valve, as shown in Fig. 2. This cock has an operating handle 42 and is provided with an additional port 43 adapted to establish communication with the brake pipe through the pipe 44 to the cylinder 45 of the valve 4, when the double heading cock is in open position; the pressure in the cylinder causing the piston 46 to move to the right to unseat the check valve 17 against the pressure of the coil spring 18 to establish communication between the pipes 19 and 20. Pipe 19 connects with the release pipe 8 and pipe 20 is in communication with the application chamber 47. In the closed position of the double heading cock 40, as shown in Fig. 2, the valve cylinder 45 is in communication with the atmosphere through a 1/16 inch port 49 in the body of the double heading cock, causing the piston 46 and check valve 17 to move to the left to cut off communication between the pipes 19 and 20.

In case the equalizing piston of distributing valve 3 does not move back to release position after a brake application has been made and release is desired and the automatic brake valve handle 13, (Fig. 1), has been returned to running position, air which may be trapped in the application chamber 47 and cylinder 5 will cause the brakes to creep on the wheels. The valve 4 prevents air being trapped in the application chamber and cylinder by establishing communication between the release pipe 8 and the application chamber when the brake pipe pressure causes the piston 46 to move against the pressure of the spring 18 to unseat the check valve 17. The air in the application chamber will then be released through pipe 20, around recess 48 of the check valve 17 when in open position, through pipe 19, release pipe 8, and the ports in the independent and automatic brake valves to the atmosphere in the usual way.

It will now be evident that the employment of the above described attachment will prevent trapped air in the application chamber causing an undesirable application or creeping of the brakes and will not prevent the immediate operation of the brakes, if desired. In case brakes are applied in an emergency application, and regardless of how the brakes are applied by the engineer or the rear end brakemen, or should the train break in two, the new device is entirely cut out by the automatic feature of the equalizing portion of the distributing valve 3.

I claim,

1. In a fluid pressure brake, the combination with a distributing valve having an application cylinder and chamber, of a valve casing in communication with the chamber, a piston slidably mounted in the valve casing, a check valve operated by said piston, a spring for resiliently holding said valve in closed position, said casing having a passage leading from one side of the check valve to the application chamber of the distributing valve and a passage leading from the other side of the check valve to the air brake release pipe.

2. In a fluid pressure brake, the combination with a distributing valve having an application cylinder and chamber and a double heading cock, of a valve casing in communication with the chamber and said cock, a piston slidably mounted in the valve casing, a check valve operated by said piston for controlling communication from said chamber to an atmospheric exhaust port, and a spring for operating said check valve in opposition to pressure on the side of the piston in communication with said cock.

3. In a fluid pressure brake, the combination with a distributing valve having an application cylinder and chamber and a double heading cock, of a valve casing in communication with the chamber and said cock, a check valve in said casing for controlling communication from said chamber to an atmospheric exhaust port, and means for operating said check valve in response to the opening and closing of said cock.

WILLIAM M. JENKINS.